(12) United States Patent
Ohlund et al.

(10) Patent No.: US 10,356,974 B2
(45) Date of Patent: Jul. 23, 2019

(54) SOWING UNIT AND USES THEREOF

(71) Applicant: SWETREE TECHNOLOGIES AB, Umea (SE)

(72) Inventors: Jonas Ohlund, Umea (SE); Asa Forsum, Eskilstuna (SE); Henrik Svennerstam, Umea (SE)

(73) Assignee: SWETREE TECHNOLOGIES AB, Umea (SE)

( * ) Notice: Subject to any disclaimer, the term of this patent is extended or adjusted under 35 U.S.C. 154(b) by 400 days.

(21) Appl. No.: 14/914,486

(22) PCT Filed: Aug. 26, 2014

(86) PCT No.: PCT/SE2014/050972
§ 371 (c)(1),
(2) Date: Feb. 25, 2016

(87) PCT Pub. No.: WO2015/030656
PCT Pub. Date: Mar. 5, 2015

(65) Prior Publication Data
US 2016/0198621 A1    Jul. 14, 2016

(30) Foreign Application Priority Data
Aug. 27, 2013 (SE) .................................. 1350978

(51) Int. Cl.
*A01G 27/04* (2006.01)
*A01G 31/02* (2006.01)
(Continued)

(52) U.S. Cl.
CPC .................. *A01C 1/02* (2013.01); *A01C 1/04* (2013.01); *A01C 1/044* (2013.01); *A01G 9/0293* (2018.02);
(Continued)

(58) Field of Classification Search
CPC ........ A01G 27/04; A01G 27/06; A01G 31/00; A01G 31/02
(Continued)

(56) References Cited

U.S. PATENT DOCUMENTS 2,648,165 A    8/1953 Nestor
3,524,279 A *  8/1970 Adams ................. A01G 9/0295
                                                    47/87
(Continued)

FOREIGN PATENT DOCUMENTS

CN    2444390        8/2001
CN    1589600 A      3/2005
(Continued)

OTHER PUBLICATIONS

Japanese Office Action dated Feb. 8, 2018 in corresponding Japanese Patent Application No. 2016-538891 with JPO machine translation of Japanese Office Action.
(Continued)

*Primary Examiner* — David J Parsley
(74) *Attorney, Agent, or Firm* — Young & Thompson (57) ABSTRACT

A sowing unit including water-absorbing material, an enclosure and a seed, wherein the water-absorbing material includes a hygroscopic negatively-charged material capable of binding a positively charged nutrient ion selected from NH4+, L-arginine, L-lysine and L-histidine; and optionally a nutrient including a positively charged nutrient ion selected from K+, NH4+, L-arginine, L-lysine and L-histidine. Methods and uses of the sowing unit are described.

14 Claims, 6 Drawing Sheets

(51) Int. Cl.
*A01C 1/02* (2006.01)
*A01C 1/04* (2006.01)
*A01G 17/00* (2006.01)
*A01G 23/00* (2006.01)
*A01G 9/029* (2018.01)

(52) U.S. Cl.
CPC ........... *A01G 17/005* (2013.01); *A01G 23/00* (2013.01); *A01G 27/04* (2013.01); *A01G 31/02* (2013.01)

(58) Field of Classification Search
USPC .......................................... 47/60, 61, 79, 80
See application file for complete search history.

(56) References Cited

U.S. PATENT DOCUMENTS

| | | | |
|---|---|---|---|
| 3,733,745 | A | 5/1973 | Ingerstedt et al. |
| 3,844,987 | A | 10/1974 | Clendinning et al. |
| 3,938,281 | A | 2/1976 | Ingerstedt et al. |
| 3,962,823 | A * | 6/1976 | Zipperer, III .......... B65D 75/52 47/73 |
| 4,186,670 | A | 2/1980 | Hagner |
| 4,190,981 | A | 3/1980 | Muldner |
| 4,209,945 | A * | 7/1980 | Dent ........................ A01G 9/00 229/117.12 |
| 4,628,633 | A | 12/1986 | Nilsson |
| 5,081,791 | A * | 1/1992 | Baron .................... A01G 24/00 47/65.8 |
| 5,401,281 | A * | 3/1995 | Chamoulaud .......... A01G 31/00 47/56 |
| 5,802,763 | A | 9/1998 | Milstein |
| 2005/0178056 | A1 | 8/2005 | Morrone |
| 2012/0036733 | A1 | 2/2012 | Dehn |

FOREIGN PATENT DOCUMENTS

| | | |
|---|---|---|
| CN | 101352119 A | 1/2009 |
| CN | 201639950 U | 11/2010 |
| EP | 1 253 819 B1 | 10/2006 |
| GB | 2 347 836 A | 9/2000 |
| GB | 2 365 738 A | 2/2002 |
| JP | S54-130309 | 10/1979 |
| JP | 1-263319 | 10/1989 |
| JP | 2008-109858 | 5/2008 |
| KR | 1020070044517 A | 4/2007 |
| WO | 8404651 | 12/1984 |
| WO | 01/87804 | 11/2001 |
| WO | 2008/044995 A1 | 4/2008 |
| WO | 2009/082351 | 7/2009 |

OTHER PUBLICATIONS

International Search Report, dated Dec. 1, 2014, from corresponding PCT Application.

* cited by examiner

SOWING UNIT AND USES THEREOF

FIELD OF THE INVENTION

The invention relates to the field of providing a method and a sowing unit for improved germination rate and growth in dry and nutrient deficient environment of seeds when planting outdoors. The sowing unit is designed to collect capillary water to increase the germination rate combined with a long term access of a nitrogen source.

BACKGROUND TO THE INVENTION

Planting of seeds directly on the ground in dry environment is very common in the world today. In many places the soil in which the seeds should be planted also lack nutrients, such as nitrogen (N), phosphorus (P) and potassium (K).

Several studies have shown that important aspects of seed germination and establishment are primarily the access to stable moisture and water conditions, more specifically capillary water.

Variations in microclimate, due to drying and wetting cycles during precipitation and sunshine have a negative influence on germination rates.

The method of seed coverage to increase the moisture conditions near the seed in order to help it germinate is a well-known technique for several hundreds of years.

It is also well known that small plants, plantlets, etc. need nutrients during growth, but a high concentration of nutrients during the initial germination stages can inhibit the germination, thereby the germination rate is reduced.

Rejuvenation of Forests

Compared to planting of plantlets, sowing is a cost-effective way to obtain a high number of stems per hectare. A high stem density provides the opportunities for high overall production/area and good wood quality. Direct seeding is therefore an effective and relatively inexpensive way to create a rejuvenation of forests, but there are still problems to be solved before direct sowing will be used in a larger scale.

One major problem with direct seeding is access to enough water in order for seeds to germinate. A substantial problem with direct seeding are therefore unstable and low germination results due to the high dependency on (unpredictable) precipitation and moisture conditions in the upper 2 cm soil layers. The availability of capillary water is however in most cases unlimited. The access to capillary water differs however due to the soil type, which together with other abiotic factors determines the evaporation rates. In sandy soils in the Nordic countries the evaporation near the surface is often so great that the upper part of the soil layer becomes too dry for seeds to swell and germinate. This is even more pronounced during hot summer days. For drier regions in the world, evaporation rates near the surface are often higher than in the boreal forest and the conditions for seed to germinate is even lower.

Moisture and accessible water have been studied in the north of Sweden during a period of 25 years. In a recent summary, it was verified that when a dry, sandy silty moraine is covered by a 1 to 2 cm of humus, the water potential is substantially higher and more stable than without this coverage. In fact the water potential in the study revealed that the moisture conditions were enough for the seeds to start swelling and germinate.

On average, only 10% of seeded pine seeds form plants after two years. To compensate for the low germination results, forest companies commonly supply seed in large amounts (40 000-60 000 seeds/ha) making the seed cost a substantial fraction of the whole regeneration costs. Another disadvantage is the fact that seeds from elite trees with long term higher growth are not feasible to use due to the high seed cost and limited seed supply. To be able to use elite tree seeds, new method and tools with a high probability for stable and high plant formation are needed.

The method of covering a seed to increase the moisture conditions near the seed in order to help it germinate is a well-known technique. It has however been uneconomical to perform in practise in the context of reforestation of forest areas due to the laboriousness of the task. In order to cost-efficiently carry out such a method a simplified device for seed coverage is necessary.

In most boreal forests there is also a lack of nutrients, such as nitrogen, potassium or phosphorus so there is a need to add a nutrient comprising at least one of these. The lack of nutrients especially nitrogen is regarded as the most limiting factor for tree growth in boreal forests.

In direct seeding there is need of a nutrient source, as the seeds are sown directly in the nutrient poor mineral soil. Especially, nitrogen is needed that is slowly released and remains in the surrounding soil of the newly sown seed for several years.

Thus, there is a need for a device which can absorb/trap capillary water and hold water, and simultaneously as it hold nutrients without reducing the germination rate.

Known Art

Different devices for handling and seeding of seeds are found on the market and in the patent literature. Such devices may contain container for the seed, water-absorbing materials and a part with nutrient. They can be formed as strips or bands, and be made of paper, starch or a decomposable material.

The US patent application US20120036733 present a felt material that can be used for seeding, which is composed of felt layer and a water absorbing containing layer.

The application GB2347836 describes a method of planting crops/trees/shrubs in arid areas without preparation to the land as in conventional practises in agriculture. The method involves the use of a biodegradable bag which may be rectangular, square or hexagonal in shape. The bag may contain a seed, root growth medium and fertilizer.

In KR100772992 a decomposable seed sealed sheet is provided to sprout and grow seeds in the original position by equally distributing and aligning the seeds at regular intervals according to the cultivation characteristic of the seeds. This sowing device is made of two layers of decomposable sheets made of starch or pulp and a seed layer in between these with a sprouting accelerator or a plant nutrient.

A similar paper tape is presented in CN201639950, which is intended for raising rice seeds into rice seedlings and making the rice seedlings bred suitable for rice planting machines.

A seed packing strip/plate with seeds having an adhesive layer used for fixing the seeds made by paper materials which are light and is easy to be dissolved is presented in CN101352119.

U.S. Pat. No. 2,648,165 describe a carrier for seeds comprising a permanently water-soluble adhesive material. The seed carrier may be formed from methyl ether of cellulose, or from either of the other synthetic resins or carbohydrates or their derivatives.

A plant sowing unit is presented in U.S. Pat. No. 5,802,763 utilizing a planting medium of growth material and a porosity increasing material and methods of preparing it. The porosity increasing material will keep water during the germination phase.

The U.S. Pat. No. 3,938,281 describes a germination and seedling assembly made of several peat bodies with a seed inside each unit. The peat bodies are placed in a plastic frame. The frame should be placed on the ground to absorb moisture from the ground to enhance the seeds to germinate. A problem with these frames is that the bottom of the frames are flat and will only partly be in contact with the soil, whereby a number of seed do not get access to water with a low germination rate as a result. Other problems have also been seen during use of these frames: birds learned to find worms under the frames and flipped them over, strong wind moved the plates, but the most severe problem was the low germination rate. The use of the device also turned out to be too complex and expensive.

In U.S. Pat. No. 3,733,745 a seedling promoting unit is presented, with a moister absorbing mass such as peat, the seed/seeds are placed on top of the peat and are covered with an evaporation protection supported by iron wires. The disadvantage with this is that the seed/seeds will not get in direct contact with capillary water from the ground. Furthermore, peat is hydrophobic after drying and thus have difficulties of reabsorbing moister once dried. A seed placed on top of a growth substrate is also exposed to sun and it is easily dried.

The invention WO 2008/044995 A1 describes a cylindrical seed planting unit, a planting arrangement for a seed planting unit, in the size of an ice hockey puck. The seed planting unit, the puck, is composed of a growth medium (peat) and one or several seeds placed at the top of the growth medium. A planting device is used to get the puck deep into the mineral soil in order to get it in contact with capillary water and swell several times, the seed will then germinate. One obvious disadvantage with this method is that the seed or seeds are placed on the top of the puck without protection from sun or seed predation. Another problem is as the puck swells the seeds are lifted upwards and are thereby continuously exposed for sun and repetitive wetting and drying cycles which reduces the germination rate. Several field trials have shown that this makes the formation of plants weather dependent.

Another invention, EP1253819, is related to a seed tape for a controlled germinating process and comprises arranged germinating units with a seed, which can be cut off one by one. This seed tape is made of two paper layers and optionally additives and a carrier in between. The paper in this invention should have a high wet strength.

The invention GB2365738 present a method of planting crops/trees/shrubs in arid areas without preparation to the land as in conventional practises in agriculture. The method involves the use of a biodegradable bag which may be rectangular, square or hexagonal in shape. The bag may contain a seed, root growth medium and fertilizer. Nothing is presented about how to attract moisture or water and keeping the nutrients close to the seed.

A manufacturing method of a seeding unit with an upper and lower film and seeds is presented in CN 1589600.

None of the above mentioned references present a way to combine large capacity of collecting water and binding of slow release nitrogen, which maintain or increase the germination rate.

Furthermore, nothing is taught about how the nutrients can be released during a long period of time after sowing the seeds.

In direct seeding other problems also exists. Wild animals or birds may eat the seeds. Rainwater can transport seeds that may have started to germinate to a non-favourable position where it could dry and die. If dry and windy, large coverage/lids may blow away. In most boreal forests there is also a lack of nutrients, such as nitrogen, potassium or phosphorus and there is a need to add a nutrient comprising at least one of these.

Thus there is a need for an easy applicable covering method and device which address the above-mentioned problems and needs. It is an objective of the present invention to provide a device and a method to address the above mentioned need.

SUMMARY OF THE INVENTION

The present invention relates to and encompasses the following items.
1. A sowing unit comprising:
   a top part and a bottom part, wherein the bottom part is the part intended to be placed against the soil when sowing with the unit;
   a water-absorbing material (2) that after exposure to moisture allows for a germinating seedling to penetrate;
   enclosure (1,4) substantially enclosing the water-absorbing material (2), wherein at least the part of the enclosure enclosing the bottom part (4) is substantially made of a rapidly water decomposable material; and
   at least one seed (7)
   wherein the sowing unit is arranged such that
      the seed (7) is located in contact with or embedded within the water-absorbing material (2) at the bottom part of the unit, and
      the water-absorbing material (2) forms a body that is of suitable size and shape such that when the unit is placed on the soil bottom part down, the seed and the soil are substantially covered by the water-absorbing material within at least 1 cm, and preferably within at least 3 cm, in radius of the seed;
   characterized by that the water-absorbing material (2) comprises:
      a hygroscopic negatively-charged material capable of binding a positively charged nutrient ion selected from $K^+$, $NH_4^+$, L-arginine, L-lysine and L-histidine; and
      optionally a nutrient comprising a positively charged nutrient ion(s) selected from $K^+$, $NH_4^+$, L-arginine, L-lysine and L-histidine.
2. A sowing unit comprising:
   a top part and a bottom part, wherein the bottom part is the part intended to be placed against the soil when sowing with the unit;
   a water-absorbing material (2) that after exposure to moisture allows for a germinating seedling to penetrate;
   enclosure (1,4) substantially enclosing the water-absorbing material (2), wherein at least the part of the enclosure enclosing the bottom part (4) is substantially made of a rapidly water decomposable material; and
   at least one seed (7)
   wherein the sowing unit is arranged such that
      the seed (7) is located in a cavity or in contact with or embedded within the water-absorbing material (2) at the bottom part of the unit, and
      the water-absorbing material (2) forms a body that is of suitable size and shape such that when the unit is placed on the soil bottom part down, the seed and the soil are substantially covered by the water-absorbing material within at least 1 cm, and preferably within at least 3 cm, in radius of the seed when the water-absorbing material is exposed to humidity;

characterized by that the water-absorbing material (2) comprises:

a hygroscopic negatively-charged material capable of binding a positively charged nutrient ion selected from $K^+$, $NH_4^+$, L-arginine, L-lysine and L-histidine; and optionally a nutrient comprising a positively charged nutrient ions selected from $K^+$, $NH_4^+$, L-arginine, L-lysine and L-histidine.

3. The sowing unit according to the preceding item, wherein the hygroscopic negatively-charged material comprises a mineral.

4. The sowing unit according to item 3, wherein the mineral comprises silica, vermiculite or zeolite, preferably vermiculite.

5. The sowing unit according to any of the preceding items, wherein the hygroscopic negatively-charged material is mixed with a swelling compound, which will expand when exposed to water/humidity. The sowing unit according to the preceding item, wherein the swelling compound is 0.1-10, 0.1-5, 0.1-4, 0.1-3, 0.1-2, 0.1-1, 0.5-1, 0.5-2, or 0.5-3 weight-% of the hygroscopic negatively-charged material in the mix.

6. The sowing unit according to any of the preceding items, wherein the hygroscopic negatively-charged material comprises an anionic polymer.

7. The sowing unit according to item 6, wherein the anionic polymer comprises an anionic polysaccharide.

8. The sowing unit according to item 7, wherein the anionic polysaccharide comprises a polysaccharide selected from the group consisting of: carboxymethyl cellulose, alginic acid, Welan Gum, Xanthan, pectate, lactobionic acid, sulfated anionic polysaccharide (SAP), pentosan polysulfate, PPS agarose, κ-carragenan and λ-carragenan.

9. The sowing unit according to any of the preceding items, wherein the water-absorbing material comprises peat.

10. The sowing unit according to any of the preceding items, wherein the water-absorbing material is vermiculite.

11. The sowing unit according to any of the preceding items, wherein the top and bottom part is made of the same paper, preferably a dissolvable paper.

12. The sowing unit according to any of the preceding items, wherein the sowing unit comprises a seed holding part (3) fastened to the part of the enclosure enclosing the bottom part (4), and where the seed (7) is placed between the water-absorbing material (2) and the seed holding part (3).

13. The sowing unit according to item 8, wherein the seed holding part (3) and/or the entire enclosure (1,4) is substantially composed of a rapidly water decomposable material.

14. The sowing unit according to any of the preceding items, wherein the rapidly water decomposable material is made of a material comprising short fibre cellulose.

15. The sowing unit according to any of the preceding items, wherein the rapidly water decomposable material is made of a material comprising carboxyl-methyl-cellulose (CMC).

16. The sowing unit according to any of the preceding items, wherein the water-absorbing material (2) has a volume of 50-200 ml, 50-100 ml, 50-200 ml, 50-300 ml, 100-200 ml, 100-300 ml, 150-200 ml, 50-300, 50-400 ml, 50-500 ml, 50-600 ml, 50-700 ml or 50-800 ml, preferably about 150 ml.

17. The sowing unit according to any of the preceding items, wherein the water-absorbing material (2) is compressed 18. The sowing unit according to any of the preceding items, wherein the compressed water-absorbing material (2) has a thickness in relation to the diameter of the seed, the thickness may be 0.1 cm, 0.2 cm, 0.3 cm, 0.4 cm, 0.5 cm, 0.6 cm, 0.7 cm, 0.8 cm, 0.9 cm, or 1.0 cm, preferably 0.3 cm.

19. The sowing unit according to any of the preceding items, wherein the water-absorbing material (2) has a thickness of 0.1 to 1 cm, 0.5 to 2 cm, 0.5 to 5 cm, 1 to 2 cm, 1 to 3 cm, 1 to 4 cm, 1 to 5 cm, 2 to 3 cm, 2 to 4 cm or 2 to 5 cm, preferably about 1 cm after swelling.

20. The sowing unit according to any of the preceding items, wherein the water-absorbing material (2) has a thickness of 0.1 to 1 cm, 0.5 to 2 cm, 0.5 to 5 cm, 1 to 2 cm, 1 to 3 cm, 1 to 4 cm, 1 to 5 cm, 2 to 3 cm, 2 to 4 cm or 2 to 5 cm, preferably about 1 cm.

21. The sowing unit according to any of the preceding items, wherein the enclosure has a series of holes (6, 5a, 5b).

22. The sowing unit according to any of the preceding items, wherein essentially no positively charged nutrients are added.

23. The sowing unit according to any of the preceding items, wherein the nutrient comprises L-arginine.

24. The sowing unit according to item 15, wherein the amount of L-arginine corresponds to 2-50 mg, 2-20 mg, 5-40 mg, 10-30 mg, 5-30 mg nitrogen per seed, preferably 5-20 mg.

25. The sowing unit according to any of the preceding items, wherein the seed is a pine tree seed or a spruce tree seed, preferably a pine tree seed.

26. The sowing unit according to any of the preceding items, wherein the sowing unit is arranged such that the water-absorbing material (2) forms a body that is of suitable size and shape such that when the unit is placed on the soil bottom part down, the seed and the soil are substantially covered by the water-absorbing material within at least 1 cm, 2 cm, 3 cm, 4 cm, 5 cm, 6 cm, 7 cm, 8 cm, 9 cm, 10 cm, 12 cm, 15 cm or 20 cm in radius of the seed, preferably 5 cm.

27. The sowing unit according to any of the preceding items, wherein the sowing unit is substantially round (circular shaped).

28. A use of a sowing unit according to any of the preceding items for sowing the seed in the sowing unit, comprising:

placing the sowing unit on the soil in contact with the soil, optionally the sowing unit is pressed to soil after the placement.

29. A use of a sowing unit according to any of the preceding items for sowing the seed in the sowing unit, comprising:

placing the sowing unit on the soil with top part upwards and the bottom part in contact with the soil.

30. The use according to any of the preceding use items, wherein prior to placing of the sowing unit, the soil on which the unit is to be placed is treated by micro-preparation.

31. A method for sowing a seed on a soil comprising the steps of:

a) providing a sowing unit comprising:
a water-absorbing material (2) comprising a nutrient; and
a seed (7);
wherein the sowing unit is arranged such that
the water-absorbing material is in contact with the seed; and the water-absorbing material forms a body that is of suitable size and form to enable placing of the sowing unit on the soil in an orientation such that viewed from the above, the seed and the soil within at least 1 cm, preferably within at least 3 cm radius relative to the seed are substantially covered by the water-absorbing material; and b) placing the sowing unit on the soil in such orientation that viewed from the above, the seed and the soil are substantially covered by the water-absorbing material within at least 3 cm of the seed or c) placing the sowing unit on the soil in such orientation that viewed from the above, the seed and the soil are substantially covered by the water-absorbing material within at least 1 cm radius relative to the seed when exposed to humidity 32. The method according to the preceding method item, wherein the seed is a pine tree seed or a spruce tree seed, preferably a pine tree seed.

33. The method according to any of the preceding method items, wherein the soil is a mineral soil and the method is for sowing in a mineral soil in a temperate climate.

34. The method according to any of the preceding method items, wherein
the water-absorbing material comprises a hygroscopic negatively-charged material capable of binding $K^+$, $NH^{4+}$, L-arginine, L-lysine or L-histidine; and
the nutrient comprises $K^+$, $NH^{4+}$, L-arginine, L-lysine or L-histidine, preferably L-arginine.

35. The method according to any of the preceding method items, wherein the water-absorbing material comprises peat.

36. The method according to any of the preceding method items, wherein the hygroscopic negatively-charged material comprises a mineral.

37. The method according to item 26, wherein the mineral comprises silica, vermiculite or zeolite, preferably vermiculite.

38. The method according to any of the preceding method items, wherein the hygroscopic negatively-charged material comprises an anionic polymer.

39. The method according to item 28, wherein the anionic polymer comprises an anionic polysaccharide.

40. The method according to item 29, wherein the anionic polysaccharide comprises a polysaccharide selected from the group consisting of: carboxymethyl cellulose, alginic acid, Welan Gum, Xanthan, pectate, lactobionic acid, sulfated anionic polysaccharide (SAP), pentosan polysulfate, PPS agarose, κ-carragenan and λ-carragenan.

41. The method according to any of the preceding method items, wherein the sowing unit is arranged such that the water-absorbing material forms a body that is of suitable size and form to enable placing of the sowing unit on the soil in an orientation such that viewed from the above, the seed and the soil within at least 1 cm, preferably within at least 3 cm, more preferably within at least 5 cm of the seed are substantially covered by the water-absorbing material,
and the method comprises placing the sowing unit on the soil in such orientation that viewed from the above, the seed and the soil within at least 1 cm, preferably within at least 3 cm, more preferably within at least 5 cm of the seed are substantially covered by the water-absorbing material.

42. The method according to any of the preceding method items, wherein the water-absorbing material has a volume of 50-200 ml, 50-100 ml, 50-200 ml, 50-300 ml, 100-200 ml, 100-300 ml, 150-200 ml, 50-300, 50-400 ml, 50-500 ml, 50-600 ml, 50-700 ml or 50-800 ml, preferably about 150 ml.

43. The method according to any of the preceding method items, wherein the water-absorbing material has a thickness of 0.1 to 1 cm, 0.5 to 2 cm, 0.5 to 5 cm, 1 to 2 cm, 1 to 3 cm, 1 to 4 cm, 1 to 5 cm, 2 to 3 cm, 2 to 4 cm or 2 to 5 cm, preferably about 1 cm.

44. The method according to any of the preceding method items, wherein the water-absorbing material has a thickness when compressed of 0.1 cm, 0.2 cm, 0.3 cm, 0.4 cm, 0.5 cm, 0.6 cm, 0.7 cm, 0.8 cm, 0.9 cm, or 1.0 cm, preferably 0.3 cm.

45. The method according to any of the preceding method items, wherein the sowing unit comprises:
a top sheet (1) and a bottom sheet (4), at least the bottom sheet (4) being water-permeable and substantially composed of a rapidly water decomposable material
a water-absorbing material (2)
arranged between the top sheet (1) and the bottom sheet (4)
at least one seed (7)
placed between the water-absorbing material and the bottom sheet.

46. The method according to item 34, wherein the seed (7) is placed in a cavity or in a hole in the water-absorbing material between the top and bottom sheet.

47. The method according to any of the preceding method items, wherein the hole has a diameter that fits the size of the preferred seed, for pine seeds the diameter might be 1.0 mm, 2.0 mm, 3.0 mm, 4.0 mm, or 5.0 mm or any size between 1.0-5.0 mm.

48. The method according to item 34, wherein the seed (7) is placed between the water-absorbing material and the bottom sheet.

49. The method according to any of items 34-35, wherein the sowing unit comprises a seed holding sheet (3) fastened to the bottom sheet (4), and the seed (7) is placed between the bottom sheet and the seed holding sheet (3).

50. The method according to any of items 34-36, wherein one or more of the sheets comprise short fibre cellulose, preferably carboxy-methyl-cellulose.

51. The method according to any of items 34-37, wherein the top and/or bottom sheet has a series of holes.

52. The method according to any of items 34-38, wherein the top sheet (2) is substantially composed of material that is readily decomposed by water.

53. The method according to any of the preceding method items, wherein the nutrient comprises nitrogen corresponding to 2-50 mg nitrogen per seed, preferably 5-20 mg.

54. The method according to any of the preceding method items, wherein the sowing unit is as defined in any one of items 1-18.

Definitions

Water-absorbing material is material that absorbs water to a high degree. The weight of water than can be absorbed by a water-absorbing material is at least 30%, 40%, 50%, 60%, 70%, 80%, 90%, 100%, 120%, 140%, 160%, 200% or 300% or the weight of the water-absorbing material. Examples of water-absorbing material are peat, vermiculite, zeolites, humus and polymers.

Hygroscopic material: a hygroscopic material absorbs water molecules from the atmosphere or the ground. The term includes cellulose, lignin and wood fibres such as cotton and paper, many fertilizer chemicals, many salts, and a wide variety of other substances. Many hygroscopic materials are also good water-absorbing materials, such as perlite, silica, vermiculite and zeolite.

Examples of hygroscopic negatively charged minerals are silica, vermiculite, and zeolite. Vermiculite is an inert natural mineral from non-expanding biotite layers. It is found in mines and by heating it assumes a non-compact structure, which is called expanded vermiculite. Vermiculite has a rather high cation exchange capacity. There are several different qualities of vermiculite with different water absorbing properties.

Other forms of hygroscopic material can be expandable or swelling compounds, which will expand when exposed to water/humidity Examples of expandable or swelling compounds are acrylamide and water storing granules. Some water storing granules are sold under the trademark name Swellgel.

Vermiculite exists in several different variants depending on where it is found in nature. In this invention compressed vermiculite can be any variant of vermiculite than can be pressed together in mould to form a solid dry unit. This unit should be strong enough to be handled by hand. By dry vermiculite is referred to a vermiculite with at the most 1, 2, 3, 4, 5, 6, 7, 8, 9, or at the most 10% water by weight. After water uptake the compressed vermiculite swells and falls apart to form a loose substrate that enable the seed to penetrate the material.

A negatively-charged material capable of binding a positively charged nutrient ion means in the context of the invention any material that is capable of substantially retaining positively charged nutrient ions in watery conditions relevant to plant growth in terms of pH and salt concentration. It is to be understood that such binding is reversible.

Binding of positively charged nutrient (e.g. nitrogen) to a negatively-charged material is a way of binding charged ion molecule to a charged substrate. Example of charged ion molecules are $K^+$, $NH_4^+$, basic amino acids, which are positively charged at neutral pH, many other positively charged groups exists that can be used as nutrients. The binding of nutrient is thus of an ion-ion interaction and is not permanent. The positively charged nutrient ions can thus be released from the negatively charge substrate and be used be a growing plant.

A rapidly water decomposable material, i.e. material that is readily decomposed by water have a very low wet tensile strength when measured using the standard ISO 3781:1983 or later versions "Paper and board—Determination of tensile strength after immersion in water".

The rapidly water decomposable material may be a sheet, a paper or similar which is dissolved by water or moisture, within a half day, a day or a few days. Also faster dissolvable materials may be used. The words resolvable, decomposable and dissolvable are interchangeable.

By a mix is meant when a material is mixed with another material, it can also be when a material is soaked or dipped in a solution comprising solved material, such as salts.

In the context of substantially covering the soil within a given radius from the seed, substantial coverage is taken to mean at least 70% coverage of the area of an imaginary circle drawn with the seed as the centre and with the given radius. More preferably, the coverage is at least 80%, even more preferably at least 90%, yet more preferably at least 95%, still preferably more than 99% and most preferably 100%.

In the context of substantially enclosing the water-absorbing material, substantial is taken to mean that most of the water-absorbing material is held within the enclosure during normal handling in transit and use. Such substantial enclosing does not exclude the possibility that the enclosure can have one or more holes or openings, or that the enclosure is constructed such that it can be easily opened and/or resealed. It is also understood that during handling and/or transit some water-absorbing material might leak out of the enclosure.

The term germination rate refers to the number of seeds that has germinated divided by the number planted seeded expressed in percentages. A seed grown outdoors is counted as germinated when the first secondary leaf or needle is seen and the seed shell has disappeared. In a greenhouse, a seed has germinated when the sprouting has reached the length of the seed. The most important factor is how the seed germinate out in the field.

BRIEF DESCRIPTION OF THE DRAWINGS

FIGS. 1A-1C provide an example of a sowing unit and the different parts, where

FIGS. 3A-3F illustrate an example of a substantially round sowing unit and the different parts, where

DETAILED DESCRIPTION OF THE INVENTION

Objects of the invention are to provide methods and devices providing an improved solution to one or more of the above-mentioned problems.

The method and device of the invention is particularly suited for providing a stable moist microclimate for a germinating seed in combination with providing a good long term nutrient supply when used in dry environment outdoors.

Seeding can be done on most terrains and is particularly suited to soils of medium coarse texture silt, fine sand and sandy silty moraine.

The sowing unit may be formed with a top part (1) and a bottom part (4) substantially as a planar member, it can be round or squared, rectangular or any shape that can be practically handled and stored.

The size of squared sowing unit can be 6×6 cm, 7×7 cm, 8×8 cm, 9×9 cm, 10×10 cm, 10×15 cm, 10×20 cm, 10×30 cm, 10×40 cm or 10×50 cm. The sowing unit may also have other combinations of sizes.

The size of a substantially round sowing unit can be for example 2, 3, 4, 5, 6, 7, 8, 9, 10, 11, 12, 13, or 14 cm in diameter. In rare cases it may have a diameter up to 50 cm. The bottom part of the unit is the part which is intended to be placed against the soil when the sowing unit is used. In this position the water-collecting material (2) will cover both the seed and the soil. The radius from the seed is dependent on both the seed, the soil and the climate zone where sowing unit is intended to be used.

In plantation for rejuvenation of forests, it is important that the zone of the water-collecting material is large enough for collecting the raising capillary water. It was unexpectedly found that a water-collecting material with a zone of about 5 cm in radius is large enough for collecting the raising capillary water to initiate germination of pine seeds. The results were confirmed in a modelling study that examined 25 years of this zone in the range of 5 cm radius from the seed. These calculations are made for a pine seed in Sweden.

Other seeds or other habitats may need a smaller or larger zones around the seed for collecting capillary water.

Figure 2:
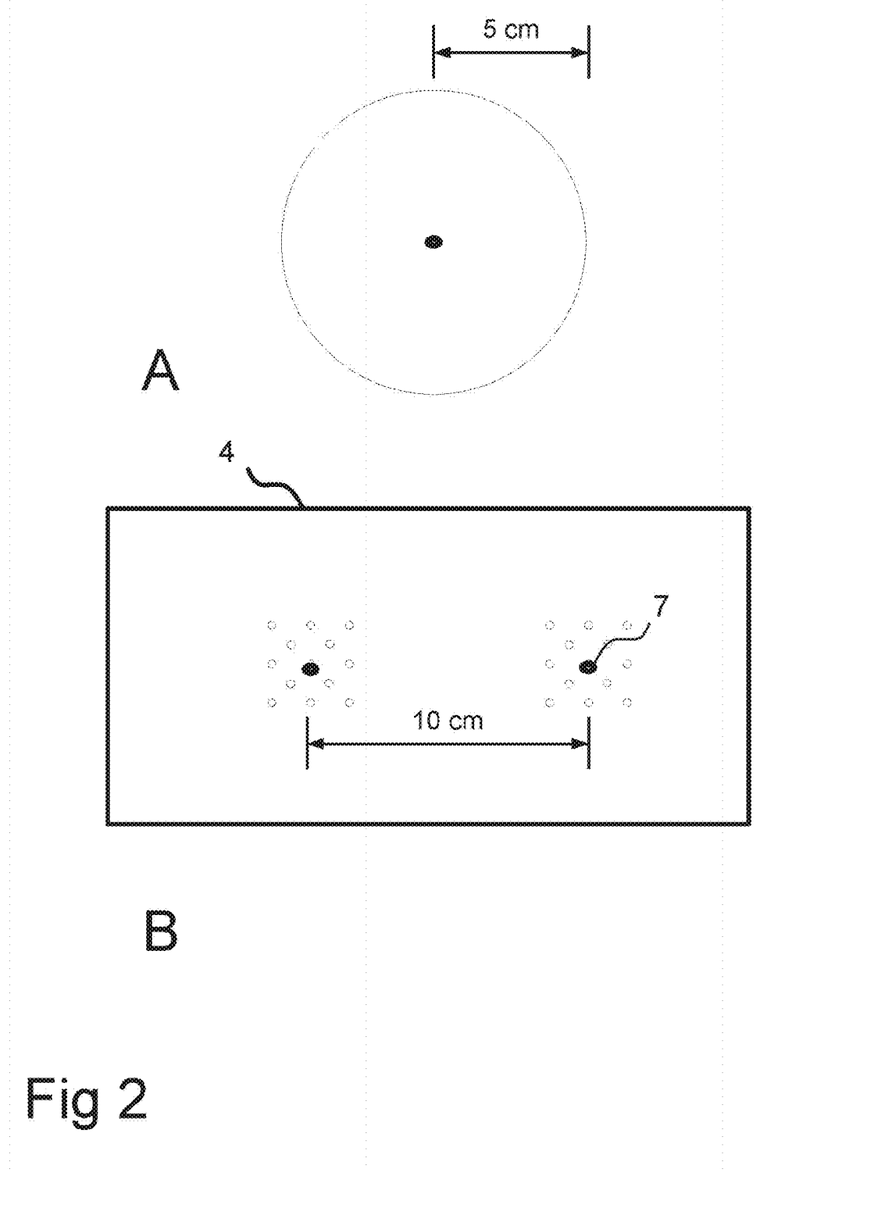
FIG. 2A illustrates the optimal distance between a seed and a border of a sowing unit.
FIG. 2B illustrates the optimal distance between two seeds.

Thus it is important that each seed has a sufficient zone of water-absorbing material around the seed, see FIG. 2. This zone may be 1, 2, 3, 4, 5, 6, 7, 8, 9, 10, 12, 14, 16, 18, 20 or up to 25 cm in diameter. This zone may not exceed 20 cm for practical reasons, but in rare cases it may not exceed a radius of 25 cm.

During field experiments different supply of nutrients was tested in combination with peat for covering the newly planted seeds. In one test done with peat mixed with vermiculite doped with L-arginine the germination rate was unexpectedly (high more than 70% in field tests), compared to just covering with peat or humus, see experiment 3 for details.

In order to find a method for sowing, some type of tool was searched for. Different types of devices for sowing were found both on the market and in the literature, but none that fulfilled the requirements for easy handling and with a design such that a water-absorbing material such as peat was covering the seed when placed on the soil above the seed.

A sowing unit was developed. A first prototype was made of paper in the size of an envelope and filled with a water-collecting material, peat, and negatively-charged material, vermiculite, which was doped with L-arginine. This prototype worked, but had a tendency to blow away in field tests. The paper was too hard and did not follow the texture on the soil. In the next version of the sowing unit was made from a made from birch, *Betula papyrifera*. This type of paper was chosen, since it was expected to be easily dissolved in contact with water. This was also verified in example 2.

Furthermore, the sowing unit made of the short fibre paper was filled with the water-absorbing material, peat, which was mixed with the hygroscopic negatively-charged material, vermiculite, which was doped with the amino acid L-arginine.

Figure 3A:
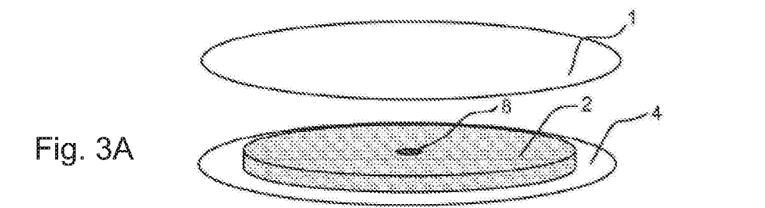
FIG. 3A shows the top part of the enclosure (1), the optionally compressed water-absorbing material (2), the bottom part of the enclosure (4), and an optional hole in the water-absorbing material (8) to hold the seed (7), FIG. 3B (upper variant) shows a substantially round sowing unit (in cross section view) where the seed is placed under a "plate" of the compressed water-absorbing material, and (lower variant) shows a substantially round sowing unit (in cross section view) where the seed is placed in a cavity formed in the bottom of the compressed water-absorbing material.
Figure 3B:
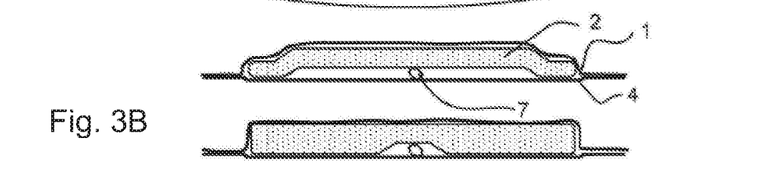
Figure 3C:
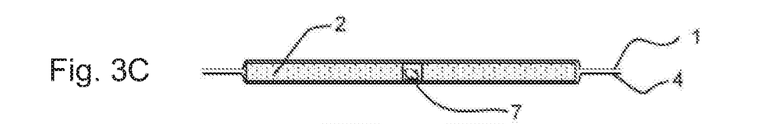
FIG. 3C shows a substantially round sowing unit (in cross section view) where the seed is placed inside a hole.
Figure 3D:
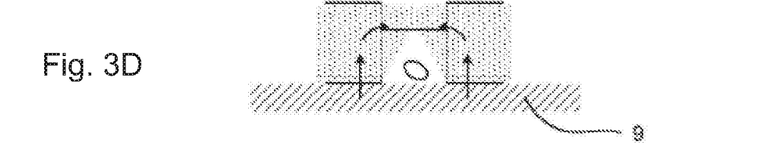
FIG. 3D shows how capillary water from the soil (9) is transported into the compressed water-absorbing material (2), whereby it will expand and cover the seed, the arrows indicating the flow of capillary water.
Figure 3E:
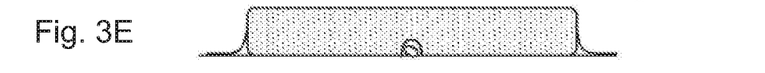
FIG. 3E, shows the swollen (expanded water-absorbing material) sowing unit.
Figure 3F:
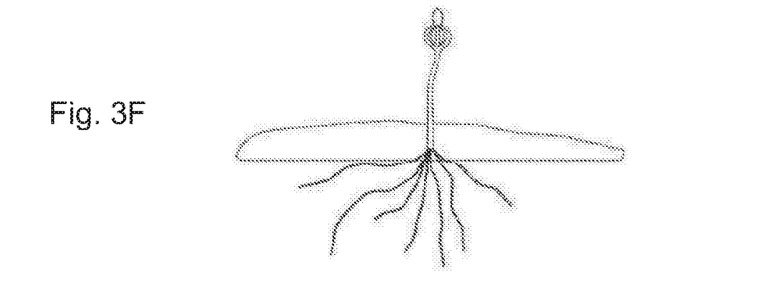
FIG. 3F, shows the germinated seed.

Other prototypes of the sowing unit were made of a top and bottom dissolvable paper with a compressed vermiculite disk. One sowing unit was made with a hole for the seed. The advantage with this version is that it is not important which side was up or down, since the seed will always fall down inside the hole. As soon as the compressed vermiculite disk start to absorb capillary water from the soil the compressed vermiculite will expand and the seed will be covered by vermiculite, see FIG. 3C to F, whereby the seed will be covered and protect it from sun and drying. One other sowing unit was made like an upside-down turned plate, with the seed placed between the bottom paper and the compressed vermiculite disk, see FIG. 3B (the upper variant). More specifically, in this embodiment, the sowing unit may have a flat, essentially round central part covering the seed, and an outer, peripheral essentially round part, wherein the outer, peripheral part essentially is designed to be in contact with the soil. Also, in another embodiment (FIG. 3B (the lower variant)), the sowing unit may be an essentially round disk with an essentially round cavity covering the seed, where the round disk essentially is designed to be in contact with the soil. Advantages with these prototypes are that they are easy to manufacture and simple to handle.

The compressed vermiculite disk may contain 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 21 g, 22 g, 23 g, 24 g, 25 g, 26 g, 27 g, 28 g, 29 g, or 30 g (gram) vermiculite, a preferred compressed vermiculite disk may contain 6 to 8 g, 6 to 9 g, 6 to 10 g, 6 to 11 g, 6 to 12 g, 6 to 13 gram vermiculite. An advantage using a hygroscopic negatively-charged material capable of binding positively charged nutrient ions is the strong ion interaction between the negatively-charged material and a positive charged nutrient ion. This interaction is expected to be the reason why the positive charged nutrient ion is released slowly from the negatively-charged material. The slow release nutrient (especially nitrogen) is essentially important for the growth and establishment of the seedling during its first two years of growth. As pine seeds normally uses the stored seed nitrogen during the first year of growth and first year two uses nitrogen from the soil a long lasting nutrient supply is therefore essential to sustain high growth and development of the emerging seedling.

Based on the experiments, it has been shown that the released nitrogen is used during a time period of two years, example 3. This is very different from conventional fertilizers where the nutrients are diluted by rain and drained away from the germinated plant fairly rapidly. Thus the fertilizing effect is not seen over that long period.

The sowing unit made of the short fibre paper as enclosure, vermiculite doped with L-arginine worked unexpectedly well in field experiment with a germination rate of about 70%.

Thus the enclosure in the sowing unit is preferably made of a paper sheets. The paper in the sowing unit should be very easily dissolved by water, mainly rain, humidity, or capillary water. The humidity can be from the surrounding air or from the ground. The paper should be more or less be completely dissolved with a few days. A water resolvable paper may comprise of short cellulose fibres with or without lignin. Modified short cellulose fibres may also be used, such as of carboxyl-methyl modified cellulose CMC. One advantage with fast dissolving paper is that wind will not easily move the sowing unit. And as soon as both the enclosure is dissolved the seed/s will be covered by the water-absorbing material, leaving no apparent clues for animals to locate the seeds, preventing birds or other animals from eating seeds. A further advantage is that no material will be left to litter the replanted area, since all components of the sowing unit are natural and will be decomposed.

Figure 4:
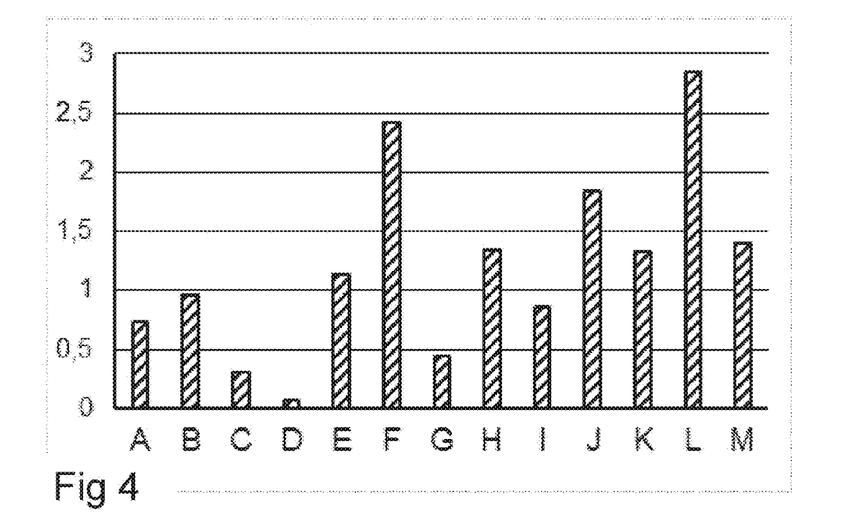
FIG. 4 illustrates draught strength DRY, kN/m, where the different pulp for papers used are defined in example 12, Table 3.
Figure 5:
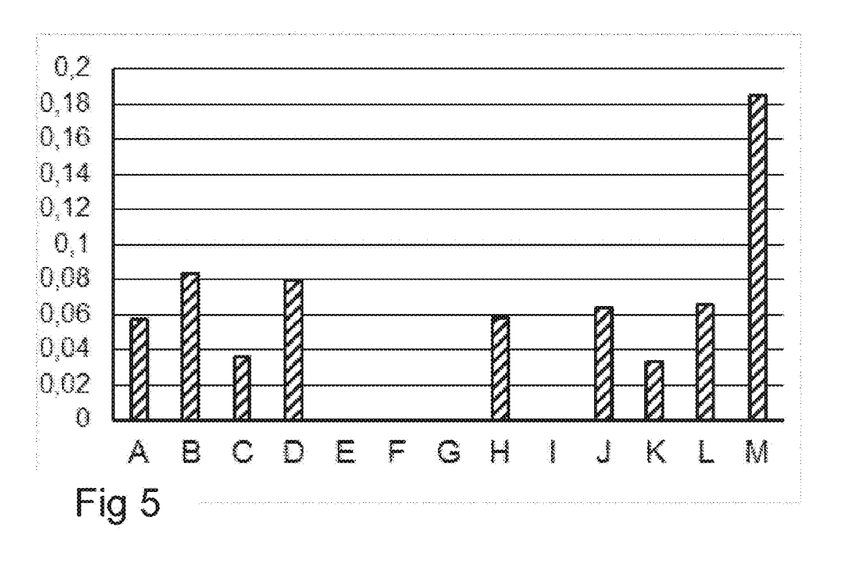
FIG. 5 illustrates draught strength WET kN/m.

The preferred paper should have a draught strength higher than 0.5 kN/m when dry and a draught strength lower that 0.1 kN/m when wet, compare FIGS. 4 and 5. The preferred paper may also have a draught index higher than 10 Nm/g when dry and when wet the draught index should be lower the 2 Nm/g, compare FIGS. 6 and 7. The draught index is related to the weight of the paper.

It should be noted that some paper are completely dissolved when wet and these papers may be the best as part of the sowing unit. For papers that are dissolved (wet) no draught strength or index can be calculated and are set to zero.

The following papers are useful examples of papers and pulps, which may be used in the present invention. Useful papers are, dried or undried bleached birch sulphate paper, mechanical wood pulp paper, unbleached softwood sulphate paper and paper made of CTMP pulp 1 or 2. According to the invention the preferred papers are made of unbleached birch or softwood sulphate pulp, or bleached dried birch sulphate pulp. Non-useful papers are ordinary papers used for printing.

The properties of the resolvable or dissolvable paper is measured by tensile strength after immersion in water, using the standard ISO 3781:1983 or later versions "Paper and board—Determination of tensile strength after immersion in water." The tensile strength is related to the fibre length and the content of lignin. The terms "draught strength" and "tensile strength" refer to the same method for determination the strength of a paper and these word can be used interchangeable.

A dissolvable paper with short cellulose fibres comprising lignin is preferred for the sowing unit. The wet tensile strength may be in the range of 0.0001-0.01 kN/m, 0.0001-0.02 kN/m, 0.0001-0.03 kN/m, 0.0001-0.04 kN/m, 0.0001-0.05 kN/m or of 0.0001-0.1 kN/m. The tensile strength might be 0.0001 to 0.001 kN/m. For some resolvable or dissolvable paper the tensile strength cannot be measured, since they are more or less completely dissolved as soon as they get in contact with water or moisture.

The bottom part of the enclosure may be easier to dissolve than the top part of the enclosure. An advantage with this is that the wind will not easily move the sowing unit, since it will dissolve quicker and thereby stick to ground quicker. Furthermore it will follow the surface contour of the soil and thereby collect the capillary water better.

The top and bottom parts of the enclosure may be brownish or coloured to match the ground, this may help prevent birds or animals eating seeds from localizing the seed/s, preferably the top part may be brownish. The bottom part might be white. Different coloured top and bottom parts may be used to help the operator to place the sowing unit on the ground in correct orientation.

It is very important that the seed is placed under the water-absorbing material (i.e. seed is covered by the water-absorbing material when viewed from above) when placed on the ground. Due to this orientation the seed will be orientated in the area with the most favourable moisture conditions. The access to moisture or water is very important for the germination rate.

It is important that the strength of the enclosure is sufficiently strong in dry stage, in order to prevent breaking the sowing unit during transport and placing it on the ground.

The enclosure may be made of one piece, or several separate pieces which may be made of the same or different materials.

The enclosure may have a series of holes (6) in the vicinity of the seed.

The seed might be kept in an optimal position with the support of a small seed holding part (3). These holes might improve the probability for the seed to germinate and simplify for the shoot to penetrate the enclosure in the case it is not resolved during extreme dry conditions.

In order to verify that the sowing unit is useful for different type of seeds an experiment was set up with seeds from Basil (*Ocimum basilicum*) and Red fescue (*Festuca rubra*). The results shown in experiment 10, shows that the germination rate was increased.

A seed holding part (3) can be fixed to the bottom part of the enclosure (4) to prevent the seeds to move during transportation and handling. If more than one seed is used in the sowing unit, the seed holding part (3) will keep the seeds separated from each other. The optimal distance is approximately 10 cm, but it can also be 6, 7, 8, 9, 11, 12, 13, and 14, up to max 50 cm in distance between the seeds. A further advantage using a seed holding part is that it prevents the seeds from getting in contact with glue or other chemicals that may have a negative effect on the germination. Glue might be needed for the assembly of the sowing unit.

Different type of dissolvable materials can be used in the top, bottom parts of the enclosure and/or seed holding part. These parts can e.g. be made of cellulose from leave trees, preferably with short cellulose fibres. Such dissolvable papers may comprise lignin, which might be preferable since it gives the sheet a brownish colour, and paper comprising lignin is shown to be easy to dissolve.

If the top part of the enclosure (1) and/or seed holding part (3) are made of dissolvable material, this may facilitate growth of the seedling.

The water-absorbing material (2) in the sowing unit might be 0.1 to 1 cm, 0.5 to 2 cm, 0.5 to 5 cm, 1 to 2 cm, 1 to 3 cm, 1 to 4 cm, 1 to 5 cm thick or 2 to 3 cm, 2 to 4 cm, 2 to 5 cm thick, when uncompressed. Optionally even thicker water-absorbing material might be used. The preferred thickness is 1 cm when uncompressed. The water-absorbing material might be compressed during transportation. If compressed for or during transportation, the thickness given in this application refers to uncompressed state achieved after the water-absorbing material has been thorough wetted, e.g. by rain after seeding.

The water-absorbing material should be loose or granular (at least in uncompressed state), such that after dissolution of the bottom part of the enclosure, the water-absorbing material is distributed on the soil ensuring a good contact between the material and the soil. This has the effect that moisture collection is improved and makes it more difficult for animals and wind to move the unit or the seed.

It is important that the thickness of the water-absorbing material is related to the seed planted, since they have different energy to penetrate soil layers. In the present invention the substrate thickness is defined in relation to the seeds used. For pine seeds the thickness of the water-absorbing material in the sowing unit is preferably in the range of 1 cm when uncompressed.

The water-absorbing material in the sowing unit may have a volume of 50-200 ml, 50-100 ml, 50-200 ml, 50-300 ml, 100-200 ml, 100-300 ml, 150-200 ml, 50-300, 50-400 ml, 50-500 ml, 50-600 ml, 50-700 ml, 50-800 ml. The preferred volume is 150 ml.

The water absorbing effect of the water-absorbing material can be enhanced by addition of an additional hygroscopic material. The water-absorbing material can be mixed with the hygroscopic material, in order to facilitate the manufacturing of the sowing unit. The additional hygroscopic material in the sowing unit may have a volume of 25-100 ml, 25-150 ml, 25-200 ml, 50-100 ml, 50-150 ml, 50-200 ml, 100-150 ml 100-200 ml, 50-300, 50-400 ml, 50-500 ml, 50-600 ml, 50-700 ml, 50-800 ml. The preferred volume is 50 ml.

The proportion of additional hygroscopic material in the water-absorbing material can be 5%, 10%, 15%, 20%, 25%, 30%, 40%, 50%, 60%, 70%, 80%, 90%, 95% or 99%, preferably about 20%.

The water-absorbing material and the hygroscopic material may also be the same, e.g. in the case of peat, or separate as is the case when a combination of peat and vermiculite is used.

A preferred version of the sowing unit would then according to the preceding items, be filled vermiculite as the only hygroscopic negatively-charged material. An even more preferred version of the sowing unit would comprise compressed vermiculite as the only hygroscopic negatively-charged material.

The compressed water-absorbing material (2) may have a thickness in relation to the diameter of the seed. The compressed water-absorbing material may have the thickness of at least the diameter of the seed of interest, i.e. the thickness might be between 1 to 1.1, 1 to 1.2, 1 to 1.3, 1 to 1.4, 1 to 1.5, 1 to 1.6, 1 to 1.7, 1 to 1.8, 1 to 1.9 or 1 to 2, 1 to 2.5, 1 to 3 times of the largest diameter of the chosen seed. For example, a seed with an approximately diameter of 3 mm (a pine seed is between 2 and 4 mm), the thickness might be 3.3 mm to 9.0 mm, preferably for pine the thickness of a compressed vermiculite disk might be 4 to 7 mm, most preferred might be a 5 or a 6 mm thick compressed vermiculite disk.

There are several advantages with vermiculite as the only hygroscopic negatively-charged material. It would be easy to produce the sowing units. Vermiculite is a mineral and very stable, thus it can be stored for very long periods without decomposition. It can be pressed together into thin layers, compressed vermiculite, which will expand when exposed to moister, thereby creating the needed thickness to collect capillary water. A further advantage of using compressed vermiculite would be a lower volume when many sowing units should be stored and handled.

The water absorbing and/or the hygroscopic material can be doped with nutrients. The nutrient may comprise the most important elements N, P and K or in combinations depending on the soil. The preferred nutrients are a basic amino acid or ammonium nitrate. Each seed might need about 10 mg of nitrogen, preferably in the stage on the salt arginine hydrochloride, Arg-HCl. Optionally, other additives might be added, such as growth enhancers, insecticides or fungicides.

This invention is supported by a series of experiments following below.

EXAMPLES

Example 1

Production of L-Arginine Doped Vermiculite

For the following experiment 55 g of L-arginin was dissolved in 1000 ml water. To this solution 60 gram vermiculite was added and stirred for one hour in room temperature. After stirring, the vermiculite was removed by vacuum filtration followed by drying at 40° C. for one hour. This gives a nitrogen concentration of approximately 5% in the produced doped vermiculite. Other concentrations of nitrogen has also been used, see the following experiments for details.

Example 2

Verification of Binding of Nutrients to Vermiculite

Arginine doped expanded vermiculite with L-arginine with a content of 10.3% L-arginine by weight was used for the experiment. Thirty milliliter of the L-arginine doped vermiculite was placed in funnel with a filter paper in the bottom. Water was added stepwise, 30 ml, at each time, and the conductivity was measured in flow-through solution after each addition of 30 ml water. The results are summarized in table 1 below.

| Volume water | Conductivity (µS/cm) measured on flow-through solution | | |
|---|---|---|---|
| added (ml) | Arginin | NH$_4$NO$_3$ | KNO$_3$ |
| 30 | 11.3 | 53.1 | 48.3 |
| 60 | 12.0 | 57.6 | 54.6 |
| 90 | 10.4 | 40.8 | 39.3 |
| 120 | 8.5 | 13.8 | 18 |
| 150 | 5.5 | 12.6 | 15.3 |
| 180 | 5 | 8.3 | 8.6 |
| 210 | 4.3 | 7 | 7 |
| 240 | 3.5 | 5.6 | 5.8 |
| 270 | 3 | 4.2 | 4.5 |
| 300 | 2.8 | 3.9 | 2.7 |
| 330 | 2.8 | 3 | 3.3 |
| 360 | 2.5 | 2.5 | 3.2 |
| 390 | 2.5 | 2.5 | 1.7 |
| 420 | 1.5 | 1.9 | 1.7 |
| 450 | 1.2 | 1.7 | 1.4 |
| 480 | 1 | 1.5 | 1.4 |
| 510 | 0.9 | 1.2 | 1 |
| 540 | 0.8 | 1.1 | 0.7 |

The results clearly show that L-arginine bind stronger to vermiculite than the other nutrients. Conductivity does not discriminate between negatively or positively charged ions. Thus, it is a good estimate that the nitrate ions NO$_3^-$ is the first ions that are washed out during the first additions of water.

Example 3

Increased Germination Rate by Using Arginine Doped Vermiculite

In most commercial plant production fertilization is a key factor. Fertilization can be carried out in several ways with respect to dosage, timing, frequency etc. One fertilizing strategy is to pre-fertilize the growth substrate before sowing or rooting of cuttings. With pre-fertilization it is possible to load the growth substrates with relatively large amounts of nutrients. The amount of nutrients should be enough to sustain plant growth for a longer time, thus eliminating the need for continuous fertilization which in turn saves work, and in rejuvenation of forests it is not practically possible at all. However, a key issue when pre-fertilizing any plant substrate with large amounts of fertilizer is the risk of salt stress, affecting germination and seedling development.

In the following experiment, L-arginine doped vermiculite was used in a pre-fertilization trial. As a reference treatment ammonium doped vermiculite was produced. Ammonium was chosen as a control since it is the only cationic commercial nitrogen fertilizer available and it is commonly used for growing pine seedlings. It should however be noted that ammonium doped vermiculite is not a commercial product as such and was only prepared for trial purposes. In the trial a dosage of 40 mg nitrogen per pot was chosen. Growing pine seedlings, 40 mg of nitrogen should be enough to sustain growth for 6 months.

Arginine doped expanded vermiculite with a L-arginine content of 10.3% by weight was used for the experiment. Ammonium doped expanded vermiculite with a nitrogen content of 2.6% was used as a control. The ammonium doped vermiculite was prepared in the same way as described for arginine doped vermiculite using a 9% ammonium solution.

The following substrate mixtures were used (per 50 ml pot):

Arginine doped vermiculite, equivalent of 40 mg nitrogen per pot:
1,2 g arginine doped vermiculite+X ml non-doped vermiculite, in total 10 ml vermiculite and 57 ml sphagnum peat.
Other nutrients were supplied by adding 1.89 ml of a solution matching the composition of arGrow Complete® with respect to all nutrients apart from nitrogen, the total volume of ingredients was more than 60 ml due to the compaction of the substrate when filling pots.
Ammonium doped vermiculite, equivalent of 40 mg nitrogen per pot:
1.73 g ammonium doped vermiculite+X ml non-doped vermiculite, in total 10 ml vermiculite and 57 ml sphagnum peat.
Other nutrients were supplied by adding 1.89 ml of a solution matching the composition of arGrow Complete® with respect to all nutrients apart from nitrogen, the total volume of ingredients was more than the pot volume of 50 ml due to the compaction of the substrate when filling pots.

For both treatments the sphagnum peat was sprayed with the solution containing macro and micro nutrients. Then the sphagnum peat was mixed with the mix of doped and non-doped vermiculite. The finished substrate was then filled into growing boxes with 60 pots, each with a volume of 50 ml.

Seeding was carried out with one seeds per container with pine *Pinus sylvestris* seeds originating from Pålberget, Sweden.

The containers were regularly irrigated and initially covered with plastic to maintain high air humidity. The plastic cover was removed approximately 1 week after sowing. Growing temperature was about 20° C. and the day length was 16 hours. Growing containers were watered at regular intervals but did not receive any additional fertilization.

After 5, 7 and 38 days after sowing the number of germinated seed/alive seedlings were counted (Table 1).

TABLE 1

Number of germinated seeds 5 and 7 days after sowing and alive seedlings 38 days after sowing expressed as the percentage of germinated seeds. n = 360 sown seeds.

| | Days after sowing | | |
|---|---|---|---|
| | 5 | 7 | 38 |
| | Germination rate in % | | |
| 40 mg N arginine | 54 | 76 | 83 |
| 40 mg N ammonium | 36 | 56 | 50 |

This experiment concludes that the use of arginine doped vermiculite as a pre-fertilized substrate results in a much higher number of seedlings than with ammonium doped vermiculite. The germination rate was very good, at least 83%.

Example 4

In a field trial from year 2011 in a dry location, close to Gällivare in Lapland Sweden, the effects of germination, seedling formation and seedling development (growth) was compared between seeds planted with, 1) a substrate pre-treated with arginine and 2) micro preparation, which is regarded as the best method used at that time for outdoor planting.

The experiment did also test different ways of applying the pre-treated substrate with arginine.

The pre-treated substrate with arginine is made of two major components, vermiculite and peat (Sphagnum). The mix of vermiculite and peat combines two favourable features, peat can hold large quantities of water compared to its weight, 220-325% of the weight, and vermiculite that can bind large amounts of the basic amino acid, L-arginine as well as water. An additional advantage with vermiculite is that very small amounts of arginine leaks to the ground compared to potassium nitrate and ammonium nitrate.

Materials and Experimental Set Up:

Vermiculite was loaded with L-arginine to reach a nitrogen (N) a concentration of 3.7% nitrogen of the total weight. The L-arginine treated vermiculite was mixed with peat, in the ratio 20 parts L-arginine treated vermiculite and 80 parts peat, resulting in 20% volume/volume L-arginine treated vermiculite in peat.

The total nitrogen load was calculated to be 100 milligram N in 200 ml of L-arginine treated vermiculite—peat mix, which corresponds to 20 mg N per seed in the following experiments.

Six different sowing methods were set up including different treatments of the soil:

The soil was sandy for all six sowings.
1. No treatment of the soil before sowing and no L-arginine treated vermiculite—peat mix was added.
2. The soil was treated by mixing the soil with a stick before sowing and no L-arginine treated vermiculite—peat mix was added.
3. The soil was treated by micro-preparation before sowing and no L-arginine treated vermiculite—peat mix was added.
4. The soil was treated by micro-preparation and L-arginine treated vermiculite—peat mix was added during the micro-preparation before sowing.
5. The soil was not treated and a 1 cm layer of L-arginine treated vermiculite—peat mix was added on top of the seeds.
6. The soil was treated by micro-preparation and a 1 cm layer of L-arginine treated vermiculite—peat mix was added on top of the seeds.

Results:

Plant formation and growth were followed for two years. Two years after sowing a part of the plants was harvested from all treatments in order to determine whether growth differences were found between treatments.

Compared to none treated mineral (sandy) soil all treatments showed a higher germination and plant formation rate.

A slightly higher plant formation rate where noted for micro prepared soil and soil mixed with substrate pre-treated with arginine.

The best plant formation rate results came from soil that had been covered by the substrate pre-treated with arginine, and where seeds had been planted in soil which was first micro prepared and then covered by the substrate pre-treated with arginine. The results are summarized in Table 2.

TABLE 2

Percentage of plant formation after two years.

| Soil | Treatment | Non-dry ground | Dry ground | Summary |
|---|---|---|---|---|
| 1. Mineral (sandy) soil (untreated) | None | 29% | 25% | 26% |
| 2. Mineral (sandy) soil mixed | None | 36% | 18% | 27% |
| 3. Mineral (sandy) soil | Micro preparation | 43% | 50% | 46% |
| 4. Mineral (sandy) soil | Soil mixed with the substrate pre-treated with arginine | 51% | 48% | 49% |
| 5. Mineral (sandy) soil | Soil covered with the substrate pre-treated with arginine | 66% | 57% | 61% |
| 6. Mineral (sandy) soil | Micro prepared soil covered with the substrate pre-treated with arginine | 74% | 66% | 70% |

Example 5

Preparation of the Sowing Units

Two thin short fibre (*Betula* fibres) papers with approximately the size of 12×17 cm were prepared.

The tensile strength of the used paper could not be measured with the instrumentation used, since it was readily dissolved in water within seconds. It was 0.00 kgN/m, when following the method in the standard ISO 3781:1983.

Figure 1:
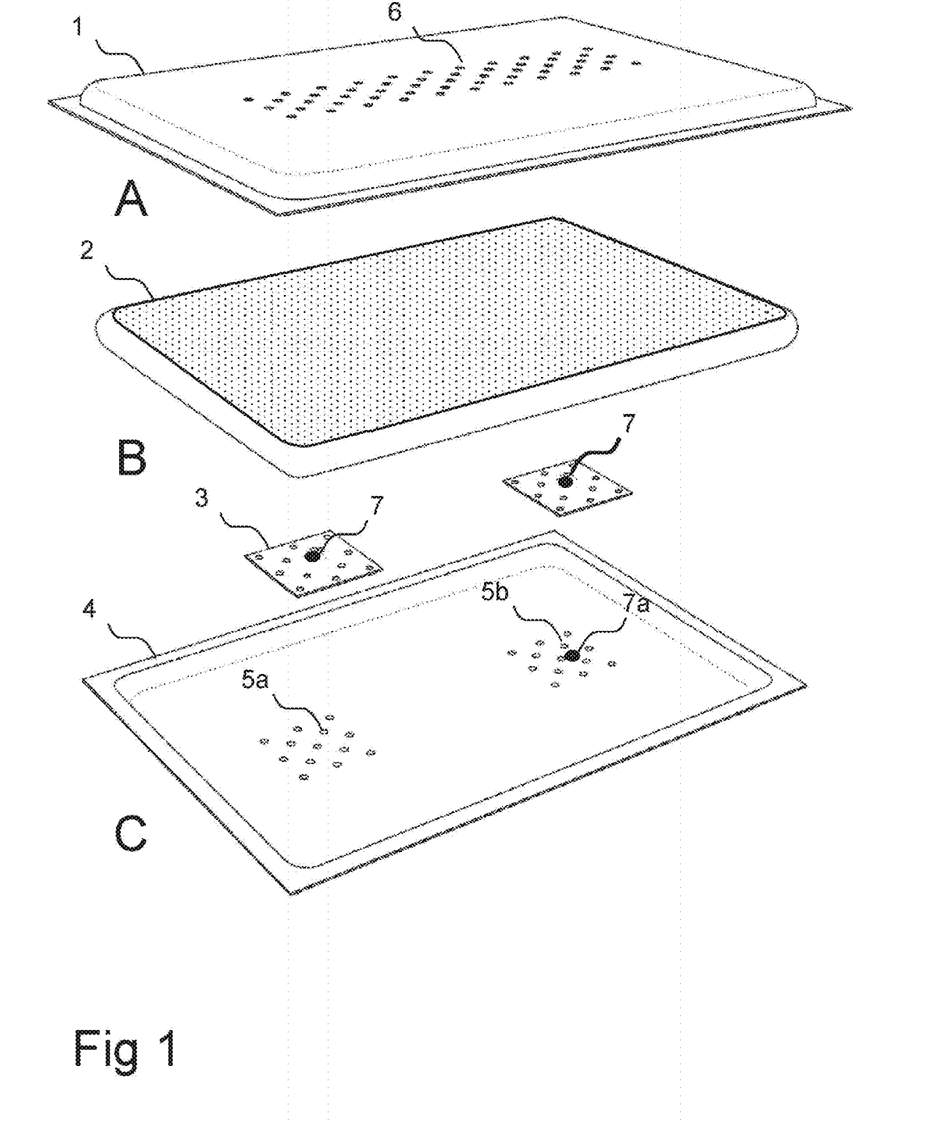
FIG. 1A illustrates the top part (1) of the enclosure with holes 6.
FIG. 1B illustrates water-absorbing material (2)
FIG. 1C illustrates a seed holding part (3), a bottom part (4) of the enclosure, holes (5a), (5b) and seed (7), (7a)

Holes were made according to the drawing in FIG. 1. Two seed holding paper with holes was made for each sowing unit with approximately the size of 5×5 cm.

The seeds used in Sweden were purchased from SkogForsk, type: Tall Våge, with an expected germination rate of 99.5%, 1000 kv 8.01.

In Finland the seed came from Hanke 7504, Norfor with an expected germination rate of 99.5%.

Preparation of the sowing unit, first two seeds was placed on the bottom paper and two seed holding papers was glued with a cellulose based glue on top of each seed. The distance between the two seeds was approximately 10 cm.

Then a cellulose based glue was applied to three sides of the bottom paper and glued together with the top paper, forming a bag, which was filled with a mix of 127.5 ml peat (made from sphagnum), 42.5 ml vermiculite and 10 mg L-arginine-HCl. Finally, the four side of the bag was glued forming the sowing unit, which looked like an envelope.

This process was further developed in collaboration with MoRe Research, Öornsköldsvik, Sweden for the production of a few hundred units.

Example 6

Dissolving of the Top and Bottom Paper.

Eleven sowing units made according to Experiment 2 were prepared and placed on sandy soil outdoors at test area for tree plantation in Bullmark, Umeå, Sweden in the 31 of May. After four days the paper had started to dissolve and all units was now strongly attached to the soil. After one week the paper was completely dissolved. This quick resolution of the paper is important, since it eliminate the risk of the sowing unit to blow away or be moved by animals (birds) as well as it creates a perfect contact layer with the ground substrate to collect the raising capillary water. The high germination results, over 73%, compared to 9% for conventional seeded seeds, also verified the effectiveness of the unit in creating a good environment for the seed to germinate and grow.

Example 7

Fifty sowing units made according to Example 5 were placed on sandy soil outdoors at test area for tree plantation in Bullmark, Umeå, Sweden in 24 of June. Normally direct seeding is not in practice after midsummer (21 Jun) due to that the conditions is regarded to be to warm and dry. The aim of the experiment was to test the performance of the units in the very dry conditions during July. As in example 6 the paper of the sowing units dissolved quickly and none of the units were moved by wind or animals. After one week the paper was completely dissolved. As in Example 6 the use of the units resulted in high and stable germination results over 79%.

Example 8

Fifty sowing units made according to Example 5 were placed on medium-grained sandy soil outdoors at test area for tree plantation in Agnsjön, Bjurholm, Sweden in 13 of Jun. 2013. As in example 6 the paper of the sowing units dissolved quickly and none of the units were moved by wind or animals. After one week the paper was completely dissolved. The use of the units resulted in high and stable germination results over 75% and well developed seedlings.

Example 9

A large scale of field experiments was made in Ruonivaara, Finland, where the sowing units was planted in June (50 units), July (50 units), August (50 units), September (50 units), October (50 units), they were also placed in soils with different moisture conditions in order to investigate if the different soils affected the germination rate. The results show that after 40 days the germination rate were about 70% for the sowing units. Additional inventory in 2014 also reviled high germination rates for the sowing units that had been planted in October and November and germinated during 2014. The recorded germination rates were 69% for October and 76% for November.

Example 10

Besides pine seeds greenhouse trials have also been performed on Chives, Oregano, Basil, Red fescue. The trials were performed in a greenhouse during 2013. Twenty seeds of each species were sown under the sowing unit in moister sandy soil. As a reference twenty seeds were sown directly in the moister sandy soil without coverage. No additional water was supplied to the seeds and seedling germination was followed weekly. The result clearly showed that the germination rate was much higher than for all seeds when the sowing unit was used again verifying the effectiveness of the unit in creating a good environment for the seed to germinate and grow.

|  | Seeds germinated | | Germination rate |
| --- | --- | --- | --- |
|  | Only sand | Sowing unit | after one week |
| Basil | 0 | 12 of 20 | 60% |
| Red fescue | 0 | 6 of 20 | 30% |

Example 11

To produce an even more effective moisture holding capacity of the sowing unit vermiculite was tested as a single filling material. Three different volumes, 50, 100 and 150 ml of vermiculite was filled into the same envelope-like bags as described in example 5. Three different fraction sizes of vermiculite were tested: 1-2 mm, 2-4 mm and 2-5 mm. These sowing units were evaluated in greenhouse trials and the results reviled a significantly increased moister holding capacity and more importantly a faster breakdown of the top paper layer compared to sowing units filled with a mixture of vermiculite and peat as used example 5. Further tests showed that it was the structure of the vermiculite, with sharp edges, together with its high water absorbing properties that increased the breakdown rate of the top paper layer. A fast breakdown of the top paper layer is an important feature to ease the penetration of the emerging seedlings and prevent movements of the sowing unit by wind or animals (birds). In the greenhouse setup, the use of 100% vermiculite did not affect the germination properties of the seeds, and all planted seeds were able to germinate and penetrate the top layer of the sowing unit.

Example 12

During the development of the sowing unit it turned out that different properties of the paper was important. In order to identify the range of these properties a test was performed including different type of papers made from different type of pulp, treatment and thickness. One ordinary copy paper was used as a reference.

Thickness is measured by the amount of pulp in gram (g) used per m2.

The type of pulp used in tested papers are bleached and non-bleached birch sulphate pulp, which can be either dried or wet, non-bleached softwood sulphate pulp, mechanical wood pulp, and chemo-thermo-mechanical pulp (CTMP) of two types.

The tensile/draught strength was measured in room temperature (20° C.) and the moisture was approximately 50% and after immersion in water, using the standard ISO 3781: 1983. In brief, a paper of 10 cm is fixed in both ends and the force is increased gradually and the force is noted when the paper is broken.

TABLE 3

Different pulp used for making a dissolvable paper.

Figure 6:
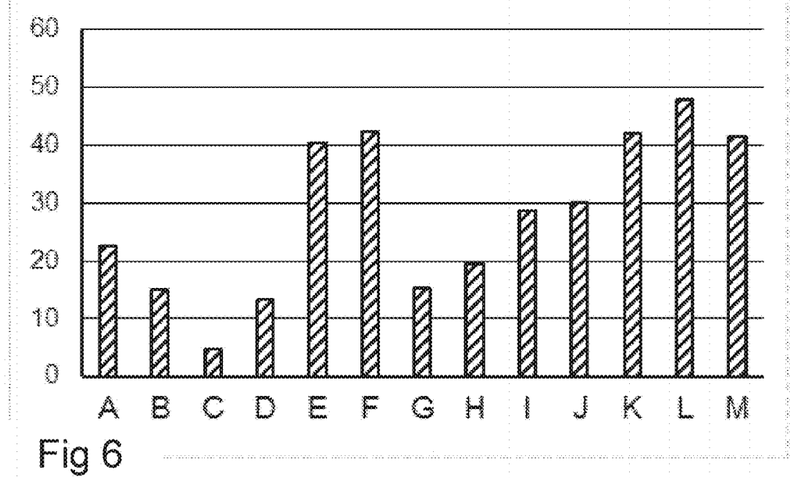
FIG. 6 illustrates draught Index DRY, Nm/g.
Figure 7:
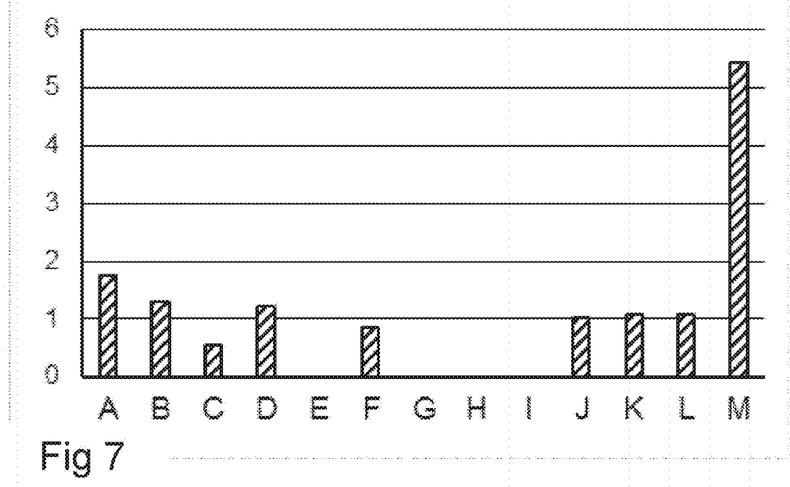
FIG. 7 illustrates draught INDEX WET Nm/g.
Figure 8:
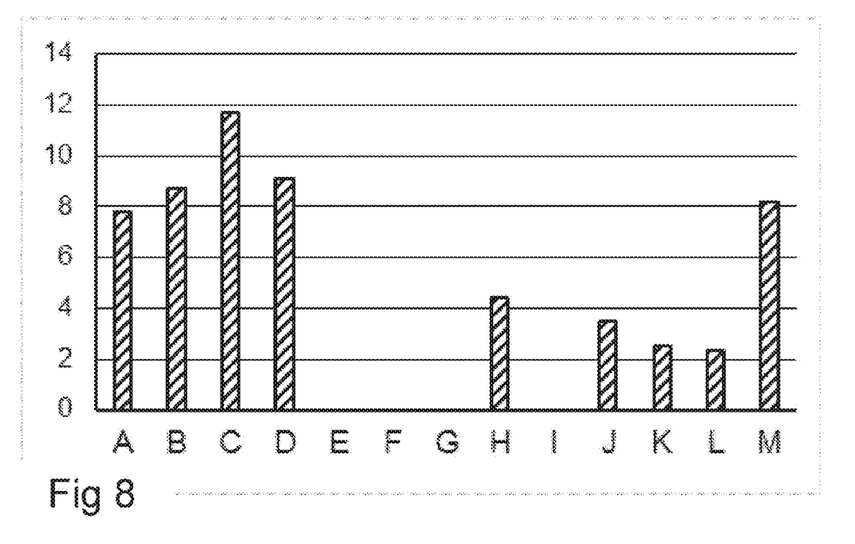
FIG. 8 illustrates the ratio between WET/DRY draught strength in %.

| | | Thickness [g/m$^2$] | |
| --- | --- | --- | --- |
| Sample: | Pulp used | FIG. 4, 5 | FIG. 6, 7, 8 |
| A | Mechanical wood pulp | 30 | 30 |
| B | Mechanical wood pulp | 60 | 60 |
| C | Chemo-thermo-mechanical pulp, type 1 | 30 | 65 |
| D | Chemo-thermo-mechanical pulp, type 2 | 65 | 65 |
| E | Non-bleached birch sulphate pulp | 30 | 30 |
| F | Non-bleached birch sulphate pulp | 65 | 65 |
| G | Non-bleached softwood sulphate pulp | 30 | 30 |
| H | Non-bleached softwood sulphate pulp | 65 | 60 |
| I | Dried bleached birch sulphate pulp | 30 | 30 |
| J | Dried bleached birch sulphate pulp | 60 | 60 |
| K | Non-dried bleached birch sulphate pulp | 30 | 30 |
| L | Non-dried bleached birch sulphate pulp | 60 | 60 |
| M | "Ordinary" paper | 65 | 34 |

Example 13

During the summer of 2014 an even larger scale of field experiments was made with over 4000 sowing units which was planted in four different locations from the northern part of Norrbotten to Västerbotten in the northern part of Sweden. These units were made as previously described of a paper made of bleached birch sulphate pulp with 50 ml vermiculite without any addition of nutrient. The pine seed was placed in the middle of a 10 cm wide sowing unit, the seed had 2-5 cm of vermiculite on all sides in order to cover a large area to be able to collect as much moister as possible. Used seeds are: Alvik T1 FP-626, Stambrev: S04/012, with a germination rate of 99.75%; and Slåttholmen T7 FP-619, Stambrev: S08/051 with a germination rate of 98.25%.

The summer of the year 2014 was in the northern part of Sweden the warmest recorded in 150 years and also very dry. Nevertheless, during the inventory in late august high germination rates were recorded at each of the four trial locations. In average, for all locations, the germination rate were 67% for the Sowing units while for the reference the germination rate only reaches 27%. See table 4 below.

TABLE 4

Germination rate from four different locations in northern Sweden.

| Field trial (Locations in Sweden) | Sowing unit germination rate (%) | Reference germination rate (%) |
| --- | --- | --- |
| Grankölen | 69.4% | 25% |
| Storsund | 60% | 27.6% |
| Forsträskhed | 73% | 27.8% |
| Husbonnliden | 64% | — |
| Average | 66.6% | 26.8% |

Example 14

During the summer of 2014 the field experiments in Ruonivaara, Finland, continued (see example 9). Two types of sowing units were used in the 2014 year trials, one with the previously described composition of a paper made out of bleached birch sulphate pulp with 50 ml arginine doped vermiculite (5 mg N/unit) and one seed. The other type of sowing unit were made with two seeds as described in example 5 but with 60 ml peat and 60 ml arginine doped vermiculite (5 mg N/unit) as a substrate mixture. The two types of sowing units were each planted in the field in June (50 units), July (50 units), August (50 units), September (50 units), October (50 units). For both types of sowing unit the inventory in July reviled high germination rates for both types of sowing units with values of 65% and 74% for sowing unit with two respective one seed (Fig X). As reference micro preparation, which is regarded as the best method used at that time for outdoor planting, were used. This treatment gave a 45% germination rate. See Table 5 below.

TABLE 5

Germination rate from Ruonivaara, Finland.

| Field trial | Sowing unit 2 seeds germination rate (%) | Sowing unit 1 seed germination rate (%) | Micro preparation germination rate (%) |
|---|---|---|---|
| Ruonivaara | 65% | 74% | 45% |

The invention claimed is:

1. A sowing unit comprising:
   a top part and a bottom part, the bottom part being configured to be placed against the soil when sowing with the unit;
   a water-absorbing material that after exposure to moisture allows for a germinating seedling to penetrate;
   an enclosure substantially enclosing the water-absorbing material at least a part of the enclosure enclosing the bottom part of the sowing unit and being substantially made of a rapidly water decomposable material; and
   at least one seed located in a cavity or in contact with or embedded within the water-absorbing material at the bottom part of the unit,
   wherein the water-absorbing material forms a body that is of suitable size and shape such that when the unit is placed on the soil bottom part down, the soil is substantially covered by the water-absorbing material at 1 cm or more in radius from the seed, and
   wherein the water-absorbing material comprises a hygroscopic negatively-charged material configured to bind a positively charged nutrient ion selected from K+, NH4+, L-arginine, L-lysine and L-histidine.

2. A sowing unit comprising:
   a top part and a bottom part, the bottom part being configured to be placed against the soil when sowing with the unit;
   a water-absorbing material that after exposure to moisture allows for a germinating seedling to penetrate;
   an enclosure substantially enclosing the water-absorbing material, at least a part of the enclosure enclosing the bottom part of the sowing unit and being substantially made of a rapidly water decomposable material; and
   at least one seed located in contact with or embedded within the water-absorbing material at the bottom part of the unit,
   wherein the water-absorbing material forms a body that is of suitable size and shape such that when the unit is placed on the soil bottom part down, the soil is substantially covered by the water-absorbing material at 1 cm or more in radius from the seed when the water-absorbing material is exposed to humidity, and
   wherein the water-absorbing material comprises a hygroscopic negatively-charged material configured to bind a positively charged nutrient ion selected from K+, NH4+, L-arginine, L-lysine and L-histidine.

3. The sowing unit according to claim 1, wherein the hygroscopic negatively-charged material comprises silica, vermiculite or zeolite.

4. The sowing unit according to claim 1, wherein the water-absorbing material is compressed.

5. The sowing unit according to claim 1, wherein no positively charged nutrients are added.

6. The sowing unit according to claim 1, wherein the sowing unit is configured such that the water-absorbing material forms a body that is of suitable size and shape such that when the unit is placed on the soil bottom part down, the seed and the soil are substantially covered by the water-absorbing material within at least 1 cm in radius of the seed.

7. The sowing unit according to claim 1, wherein the nutrient ion comprises L-arginine.

8. The sowing unit according to claim 1, wherein the seed is a pine tree seed or a spruce tree seed.

9. The sowing unit according to claim 2, wherein the hygroscopic negatively-charged material comprises one of silica, vermiculite, and zeolite.

10. The sowing unit according to claim 2, wherein the water-absorbing material is compressed.

11. The sowing unit according to claim 2, wherein no positively charged nutrients are added.

12. The sowing unit according to claim 2, wherein the sowing unit is configured such that the water-absorbing material forms a body that is of suitable size and shape such that when the unit is placed on the soil bottom part down, the seed and the soil are substantially covered by the water-absorbing material within at least 1 cm in radius of the seed.

13. The sowing unit according to claim 2, wherein the nutrient ion comprises L-arginine.

14. The sowing unit according to claim 2, wherein the seed is a pine tree seed or a spruce tree seed.

* * * * *